United States Patent
Kikuchi et al.

(10) Patent No.: US 8,710,110 B2
(45) Date of Patent: Apr. 29, 2014

(54) METHODS OF PRODUCING THE MEMBRANES AND THE USES OF MEMBRANES AS BATTERY SEPARATOR FILMS

(71) Applicant: Toray Battery Separator Film Co., Ltd., Nasushiobara (JP)

(72) Inventors: Shintaro Kikuchi, Saitama (JP); Kotaro Takita, Yokohama (JP); Kazuhiro Yamada, Nasushiobara (JP)

(73) Assignee: Toray Battery Separator Film Co. Ltd. (JP)

( * ) Notice: Subject to any disclaimer, the term of this patent is extended or adjusted under 35 U.S.C. 154(b) by 0 days.

(21) Appl. No.: 13/912,538

(22) Filed: Jun. 7, 2013

(65) Prior Publication Data

US 2013/0273434 A1 Oct. 17, 2013

Related U.S. Application Data

(62) Division of application No. 13/047,994, filed on Mar. 15, 2011.

(60) Provisional application No. 61/313,970, filed on Mar. 15, 2010.

(51) Int. Cl.
- *B01J 49/00* (2006.01)
- *B32B 3/26* (2006.01)
- *C06B 21/00* (2006.01)
- *H01M 2/16* (2006.01)

(52) U.S. Cl.
USPC ........... 521/27; 428/304.4; 428/516; 264/3.3; 264/479; 429/144; 429/523

(58) Field of Classification Search
USPC ........... 521/27; 428/304.4, 516; 264/3.3, 479; 429/144, 523
See application file for complete search history.

(56) References Cited

U.S. PATENT DOCUMENTS

| | | | |
|---|---|---|---|
| 7,700,182 B2 * | 4/2010 | Ozaki et al. | 428/304.4 |
| 7,981,536 B2 * | 7/2011 | Kono et al. | 429/144 |
| 2007/0264483 A1 * | 11/2007 | Ozaki et al. | 428/304.4 |
| 2008/0057388 A1 | 3/2008 | Kono et al. | |
| 2008/0057389 A1 * | 3/2008 | Kono et al. | 429/144 |

FOREIGN PATENT DOCUMENTS

| | | | |
|---|---|---|---|
| JP | 2002-321323 | | 11/2002 |
| JP | 2002321323 A | * | 11/2002 |
| JP | 2004-196870 | | 7/2004 |
| JP | 2004196870 A | * | 7/2004 |
| WO | 97/23554 A1 | | 7/1997 |
| WO | 2007/052663 A1 | | 5/2007 |
| WO | 2007/132942 A1 | | 11/2007 |
| WO | 2008/016174 A1 | | 2/2008 |
| WO | 2008/140835 A1 | | 11/2008 |

OTHER PUBLICATIONS

Sun, T. et al., "Effect of Short Chain Branching on the Coil dimensions of Polyolefins in Dilute Solution," *Macromolecules*, 2001, vol. 34, No. 19, pp. 6812-6820.

* cited by examiner

*Primary Examiner* — Michael Bernshteyn
(74) *Attorney, Agent, or Firm* — DLA Piper LLP (US)

(57) ABSTRACT

A process of producing a membrane includes extruding diluent and polymer to form an extrudate, the polymer includes a first polyethylene having an Mw<$1.0 \times 10^6$, a second polyethylene having an Mw≥$1.0 \times 10^6$, and a polypropylene having an Mw≥$5.0 \times 10^5$ and a ΔHm≥80.0 J/g; wherein the sum of the polypropylene having an Mw≥$5.0 \times 10^5$ and a ΔHm≥80.0 J/g and the second polyethylene is ≥15.0 wt. % and processing the extrudate into a membrane having a thickness ≤12.0 μm by stretching the extrudate in at least one planar direction at about 108.0 to 116.0° C. after removing the solvent to a magnification factor of ≤1.1 and excludes any stretching of the extrudate after removing the solvent at a magnification factor or >1.1 and removing at least a portion of the diluent from the extrudate.

3 Claims, No Drawings

METHODS OF PRODUCING THE MEMBRANES AND THE USES OF MEMBRANES AS BATTERY SEPARATOR FILMS

TECHNICAL FIELD

This disclosure relates to microporous membranes having high meltdown temperature and high strength. The disclosure also relates to the production of these membranes and the use of the membranes as battery separator films.

BACKGROUND

Microporous membranes are useful as battery separator film ("BSF") for primary and secondary batteries. These batteries include lithium ion secondary batteries, lithium ion polymer secondary batteries, nickel-hydrogen batteries, nickel-cadmium batteries, nickel-zinc batteries, silver-zinc batteries, etc.

Microporous polymeric membranes can be used as battery separator film ("BSF") in, e.g., lithium ion batteries. Lithium ion batteries in which the electrolyte is a gel electrolyte or polymeric electrolyte, e.g., an electrolyte that is contained within a polymeric medium, ("lithium ion polymer batteries") generally utilize BSFs comprising a polymer compatible with (e.g., has affinity for) the polymeric medium in which the electrolyte is contained. BSFs for lithium ion polymer batteries generally have a significantly smaller thickness compared to BSFs commonly used in, e.g., cylindrical and prismatic-format lithium ion batteries.

BSFs comprising polymer have increased polymer mobility at elevated battery temperature, which leads to a significant permeability decrease. This effect is beneficial in BSFs because the permeability decrease at elevated temperature results in a decrease in battery electrochemical activity, thereby lessening the risk of battery failure under overcharge, rapid-discharge, or other high-temperature battery conditions. Since battery internal temperature can continue to increase even at reduced electrochemical activity (e.g., from temperature overshoot), it is desirable to increase membrane thermal stability at elevated temperature to further lessen the risk of battery failure. This can be accomplished by including a high melting-point species (e.g., polypropylene) in the membrane's polymer to increase the BSFs meltdown temperature to a value $\geq 145°$ C. The temperature difference between polyethylene and polypropylene melting points and their physical incompatibility leads to difficulties in producing membranes containing both polymers, particularly when the membrane is thin, as is the case in lithium ion polymer batteries.

Another important BSF property is the BSFs resistance to pin puncture (commonly referred to as the BSFs "pin puncture strength"). Since BSF pin puncture strength is proportional to BSF thickness for BSFs of substantially the same composition and porosity, batteries utilizing thin BSFs such as lithium ion polymer batteries benefit when the BSF has a relatively high pin puncture strength per unit thickness. It is desired, therefore, to produce a relatively thin, high strength polymeric membrane having a relatively high meltdown temperature.

SUMMARY

We provide membranes comprising a first polyethylene having an $Mw<1.0\times10^6$, a second polyethylene having an $Mw \geq 1.0\times10^6$, and a polypropylene having an $Mw \geq 5.0\times10^5$ and a $\Delta Hm \geq 80.0$ J/g; wherein (a) the sum of the amounts of (i) polypropylene having an $Mw \geq 5.0\times10^5$ and a $\Delta Hm \geq 80.0$ J/g and (ii) the second polyethylene is $\geq 15.0$ wt. %, the weight percents being based on the total weight of the polymer in the membrane; (b) the membrane has a thickness $\leq 12.0$ µm; and (c) the membrane is microporous.

We also provide processes of producing microporous membranes, comprising:
(1) extruding a mixture of diluent and polymer to form an extrudate, the polymer comprising a first polyethylene having an $Mw<1.0\times10^6$, a second polyethylene having an $Mw \geq 1.0\times10^6$, and a polypropylene having an $Mw \geq 5.0\times10^5$ and a $\Delta Hm \geq 80.0$ J/g; wherein the sum of the amounts of the polypropylene having an $Mw \geq 5.0\times10^5$ and a $\Delta Hm \geq 80.0$ J/g and the second polyethylene is $\geq 15.0$ wt. %, all the weight percents being based on the total weight of the polymer in the mixture;
(2) processing the extrudate into a microporous membrane having a thickness $\leq 12.0$ µm.

We further provide batteries comprising an anode, a cathode, and electrolyte, and a battery separator located between the anode and the cathode, the battery separator comprising a membrane comprising a first polyethylene having an $Mw<1.0\times10^6$, a second polyethylene having an $Mw \geq 1.0\times10^6$, and a polypropylene having an $Mw \geq 5.0\times10^5$ and a $\Delta Hm \geq 80.0$ J/g; wherein (a) the sum of the amounts of (i) the polypropylene having an $Mw \geq 5.0\times10^5$ and a $\Delta Hm \geq 80.0$ J/g and (ii) the second polyethylene is $\geq 15.0$ wt. %, the weight percents being based on the total weight of the polymer in the membrane; (b) the membrane has a thickness $\leq 12.0$ µm; and (c) the membrane is microporous.

DETAILED DESCRIPTION

While producing microporous membranes comprising polyethylene and polypropylene, we observed that increasing the amount of polypropylene in the membrane increased the membrane's meltdown temperature, but decreased film yield, particularly in thin membranes, as a result of film tearing during membrane stretching. Reducing the amount of membrane stretching resulted in greater yield, but led to a decrease in the membrane's normalized pin puncture strength to a value that is less than the desired value of $3.20\times10^2$ mN/µm for BSFs having a thickness $\leq 12.0$ µm. We discovered that this difficulty can be overcome when the membrane comprises $\leq 85.0$ wt. % of a first polyethylene having a weight average molecular weight ("Mw") $\leq 1.0\times10^6$, a second polyethylene having an $Mw \geq 1.0\times10^6$, and a polypropylene having an $Mw \geq 5.0\times10^5$ and a $\Delta Hm \geq 80.0$ J/g, wherein membrane includes $\geq 15.0$ wt. % of the second polyethylene and the polypropylene, the weight percents being based on the total weight of the polymer within the membrane. Since relatively high pin puncture strength is observed even without membrane stretching when the combined amount of polypropylene and second polyethylene is $\geq 15.0$ wt. %, relatively thin membranes (thickness $\leq 12.0$ µm) having higher meltdown temperatures and pin puncture strength can be produced at higher yield.

For the purpose of this description and the appended claims, the term "polymer" means a composition including a plurality of macromolecules, the macromolecules containing recurring units derived from one or more monomers. The macromolecules can have different size, molecular architecture, atomic content and the like. The term "polymer" includes macromolecules such as copolymer, terpolymer and the like. "Polyethylene" means polyolefin containing $\geq 50\%$ (by number) recurring ethylene-derived units, preferably polyethylene homopolymer and/or polyethylene copolymer wherein at least 85% (by number) of the recurring units are ethylene units. "Polypropylene" means polyolefin containing >50.0% (by number) recurring propylene-derived units, preferably polypropylene homopolymer and/or polypropylene copolymer wherein at least 85% (by number) of the recurring units are propylene units. The term isotactic polypropylene means polypropylene having a meso pentad fraction ≥about 50.0 mol. % mmmm pentads, preferably ≥96.0 mol. % mmmm pentads (based on the total number of moles of isotactic polypropylene). A "microporous membrane" comprises a thin film having pores, where ≥90.0 percent (by volume) of the film's pore volume resides in pores having average diameters in the range of from 0.01 μm to 10.0 μm. With respect to membranes produced from extrudates, the machine direction ("MD") is defined as the direction in which an extrudate is produced from a die. The transverse direction ("TD") is defined as the direction perpendicular to both MD and the thickness direction of the extrudate. MD and TD can be referred to as planar directions of the membrane, where the term "planar" in this context means a direction lying substantially in the plane of the membrane when the membrane is flat.

Polymer Characteristics

First Polyethylene (PE1)

The first polyethylene ("PE1") may generally be characterized by a weight average molecular weight ("Mw") <1.0×$10^6$. The first polyethylene may include a mixture or reactor blend of polyethylenes, such as a mixture of two or more polyethylenes ("PE1a" and "PE1b" and the like, as described below).

PE1a

The first polyethylene ("PE1") can be, e.g., a polyethylene (PE1a) having an Mw<1.0×$10^6$, e.g., in the range of from about 1.0×$10^5$ to about 0.90×$10^6$; a molecular weight distribution ("MWD" defined as Mw divided by the number average molecular weight) ≤50.0, e.g., in the range of from about 2.0 to about 20.0; and a terminal unsaturation amount <0.20 per 1.0×$10^4$ carbon atoms. Optionally, PE1a has an Mw in the range of from about 4.0×$10^5$ to about 5.0×$10^5$, and an MWD of from about 3.0 to about 10.0. Optionally, PE1a has an amount of terminal unsaturation ≤0.20 per 1.0×$10^4$ carbon atoms, or ≤0.14 per 1.0×$10^4$ carbon atoms, or ≤0.12 per 1.0×$10^4$ carbon atoms, e.g., in the range of 0.05 to 0.14 per 1.0×$10^4$ carbon atoms (e.g., below the detection limit of the measurement).

PE1b

The first polyethylene ("PE1") can be, e.g., polyethylene (PE1b) having an Mw<1.0 ×$10^6$, e.g., in the range of from about 2.0×$10^5$ to about 0.9×$10^6$, an MWD≤50.0, e.g., in the range of from about 2 to about 50, and a terminal unsaturation amount ≥0.20 per 1.0×$10^4$ carbon atoms. Optionally, PE1b has an amount of terminal unsaturation ≥0.30 per 1.0×$10^4$ carbon atoms, or ≥0.50 per 1.0×$10^4$ carbon atoms, e.g., in the range of 0.6 to 10.0 per 1.0×$10^4$ carbon atoms. A non-limiting example of PE1b is one having an Mw in the range of from about 3.0×$10^5$ to about 8.0×$10^5$, for example about 7.5×$10^5$, and an MWD of from about 4 to about 15.

PE1 can be, e.g., an ethylene homopolymer or an ethylene/α-olefin copolymer containing ≤5.0 mole % of one or more comonomer such as α-olefin, based on 100% by mole of the copolymer. Optionally, the α-olefin is one or more of propylene, butene-1, pentene-1, hexene-1, 4-methylpentene-1, octene-1, vinyl acetate, methyl methacrylate, or styrene. PE1 can have a melting point ≥132° C. PE1a can be produced, e.g., in a process using a Ziegler-Natta or single-site polymerization catalyst, but this is not required. The amount of terminal unsaturation can be measured in accordance with the procedures described in PCT Publication WO 97/23554, for example, the subject matter of which is incorporated herein by reference. PE1b can be produced using a chromium-containing catalyst, for example.

Second Polyethylene (PE2)

The second polyethylene ("PE2") can be, e.g., a polyethylene having an Mw≥1.0×$10^6$, e.g., in the range of from about 1.0×$10^6$ to about 5.0×$10^6$ and an MWD of from about 1.2 to about 50.0. A non-limiting example of PE2 is one having an Mw of from about 1.0×$10^6$ to about 3.0×$10^6$, for example about 2.0×$10^6$, and an MWD≤20.0, e.g., of from about 2.0 to about 20.0, preferably about 4.0 to about 15.0. PE2 can be, e.g., an ethylene homopolymer or an ethylene/α-olefin copolymer containing ≤5.0 mole % of one or more comonomers such as α-olefin, based on 100% by mole of the copolymer. The comonomer can be, for example, one or more of, propylene, butene-1, pentene-1, hexene-1, 4-methylpentene-1, octene-1, vinyl acetate, methyl methacrylate, or styrene. These polymers or copolymers can be produced using a Ziegler-Natta or a single-site catalyst, though this is not required. PE2 can have a melting point ≥134° C. The melting points of PE1 and PE2 can be determined using the methods disclosed in PCT Patent Publication No. WO 2008/140835, for example, the subject matter of which is incorporated herein by reference.

Polypropylene (PP)

The polypropylene ("PP") can be, e.g., polypropylene having an Mw≥5.0×$10^5$, such as ≥6.0×$10^5$ or ≥7.5×$10^5$, for example in the range of from about 0.8×$10^6$ to about 3.0×$10^6$, such as in the range of from 0.9×$10^6$ to 2.0×$10^6$. Optionally, the PP has a Tm≥160.0° C. and a ΔHm≥80.0 J/g, e.g., ≥90.0 J/g or ≥100.0 J/g, such as in the range of from 110 J/g to 120 J/g. Optionally, the PP has an MWD≤20.0, e.g., in the range of from about 1.5 to about 10.0, such as in the range of from about 2.0 to about 8.5. Optionally, the PP is a copolymer (random or block) of propylene and ≤5.0 mole % of a comonomer, the comonomer being, e.g., one or more α-olefins such as ethylene, butene-1, pentene-1, hexene-1, 4-methylpentene-1, octene-1, vinyl acetate, methyl methacrylate, styrene and the like; or diolefins such as butadiene, 1,5-hexadiene, 1,7-octadiene, 1,9-decadiene and the like.

The PP may be isotactic polypropylene. The PP may have (a) a meso pentad fraction ≥about 90.0 mol. % mmmm pentads, optionally ≥96.0 mol. % mmmm pentads, preferably ≥96.0 mol. % mmmm pentads; and (b) may have an amount of stereo defects ≤about 50.0 per 1.0×$10^4$ carbon atoms, e.g., ≤about 20 per 1.0×$10^4$ carbon atoms, or ≤about 10.0 per 1.0×$10^4$ carbon atoms, such as ≤about 5.0 per 1.0×$10^4$ carbon atoms. Optionally, the PP may have one or more of the following properties: (i) a Tm≥162.0° C.; (ii) an elongational viscosity ≥about 5.0×$10^4$ Pa sec at a temperature of 230° C. and a strain rate of 25 sec$^{-1}$; (iii) a Trouton's ratio ≥about 15 when measured at a temperature of about 230° C. and a strain rate of 25 sec$^{-1}$; (iv) a Melt Flow Rate ("MFR;" ASTM D-1238-95 Condition L at 230° C. and 2.16 kg) ≤about 0.1 dg/min, e.g., ≤about 0.01 dg/min (i.e., a value is low enough that the MFR is essentially not measurable); or (v) an amount extractable species (extractable by contacting the PP with boiling xylene) ≤0.5 wt. %, e.g., ≤0.2 wt. %, such as ≤0.1 wt. % or less based on the weight of the PP.

The PP may be an isotactic PP having an Mw in the range of from about 0.9×$10^6$ to about 2.0×$10^6$, an MWD≤8.5, e.g., in the range of from 2.0 to 8.5, e.g., in the range of from 2.5 to 6.0, and a ΔHm≥90.0 J/g. Generally, such a PP has a meso pentad fraction ≥94.0 mol. % mmmm pentads, an amount of stereo defects ≤about 5.0 per 1.0×$10^4$ carbon atoms, and a Tm≥162.0° C.

A non-limiting example of the PP, and methods for determining the PP's Tm, meso pentad fraction, tacticity, intrinsic viscosity, Trouton's ratio, stereo defects, and amount of extractable species are described in PCT Patent Publication No. WO 2008/140835.

The PP's ΔHm, is determined by the methods disclosed in PCT Patent Publication No. WO 2007/132942, the subject matter of which is incorporated by reference herein. Tm can be determined from differential scanning calorimetric (DSC) data obtained using a PerkinElmer Instrument, model Pyris 1 DSC. Samples weighing approximately 5.5-6.5 mg are sealed in aluminum sample pans. The DSC data are recorded by first heating the sample from 25° C. to 230° C. at a rate of 10° C./minute, called first melt (no data recorded). The sample is kept at 230° C. for 10 minutes before a cooling-heating cycle is applied. The sample is then cooled from about 230° C. to about 25° C. at a rate of 10° C./minute, called "crystallization," then kept at 25° C. for 10 minutes, and then heated to 230° C. at a rate of 10° C./minute, called ("second melt"). The thermal events in both crystallization and second melt are recorded. The melting temperature ($T_m$) is the peak temperature of the second melting curve and the crystallization temperature ($T_c$) is the peak temperature of the crystallization peak.

Microporous Membrane Composition

This description is not meant to foreclose other examples within the broader scope of this disclosure. The membranes may include an amount $A_1$ of a first polyethylene, an amount $A_2$ of a second polyethylene, and an amount $A_3$ of a polypropylene having an Mw≥$5.0\times10^5$ and a ΔHm≥80.0 J/g. $A_1$, $A_2$, and $A_3$ can be expressed as weight percents, based on the weight of polymer in the membrane. For example, the weight percents can be based on the combined weight of the first and second polyethylenes and the polypropylene in the membrane, e.g., $A_1+A_2+A_3=100.0$ wt. %. The weight percents can be based on the weight of the membrane, e.g., as can be the case when the membrane consists essentially of (or even consists of) the first and second polyethylenes and polypropylene only.

For example, the membrane may include an amount $A_1$ of the first polyethylene (PE1), where $A_1\leq85.0$ wt. %, an amount $A_2$ of the second polyethylene (PE2), and an amount $A_3$ of the polypropylene having an $10^5$ and a ΔHm≥80.0 J/g, where the sum of $A_2$ and $A_3\geq15.0$ wt. %, the weight percents being based on the total weight of the polymer within the membrane. In other words, the sum of $A_2$ and $A_3$ may be an amount $B_1$, and $B_1\geq15.0$ wt. %, the weight percents being based on the total weight of the polymer within the membrane.

The amount $A_1$ of the first polyethylene (PE1) may be in the range of 70.0 wt. %≤$A_1$≤85.0 wt. %, the weight percent being based on the total weight of the polymer in the membrane. Optionally, $A_1$ may be in the range of 72.0 wt. %≤$A_1$≤84.0 wt. %, e.g., in the range of 75.0 wt. % to 83.0 wt. %, based on the total weight of polymer in the membrane.

The amount $A_2$ of the second polyethylene (PE2) may be in the range of 1.0 wt. %≤$A_2$≤19.0 wt. %, the weight percent being based on the total weight of the polymer in the membrane. Optionally, $A_2$ may be in the range of 3.0 wt. %≤$A_2$≤15.0, e.g., in the range of 5.0 wt. % to 13.0 wt. %, based on the total weight of polymer in the membrane.

The amount $A_3$ of polypropylene (PP) may be in the range of 1.0 wt. %≤$A_3$≤15.0 wt. %, the weight percent being based on the total weight of the polymer in the membrane. Optionally, $A_3$ may be in the range of 3.0 wt. %≤$A_3$≤15.0, e.g., in the range of 5.0 wt. % to 13.0 wt. %, based on the total weight of polymer in the membrane.

The sum of (i) the amount $A_2$ of the second polyethylene (PE2) and (ii) the amount $A_3$ of the polypropylene (PP) may be an amount $B_1$ in the range of 15.0 wt. %≤$B_1$≤30.0 wt. %, the weight percent being based on the total weight of the polymer in the membrane. Optionally, $B_1$ may be in the range of 16.0 wt. %≤$B_1$≤28.0, e.g., in the range of 17.0 wt. % to 25.0 wt. %, based on the total weight of polymer in the membrane.

In an example particularly useful as a BSF for lithium ion polymer batteries, a membrane comprises 79.0 wt. % to 81.0 wt. % of PE1a, 14.0 wt. % to 16.0 wt. % of PE2, and 3.0 wt. % to 7.0 wt. % of PP, wherein (i) the PE1a has an Mw in the range of from about $4.0\times10^5$ to about $6.0\times10^5$, an MWD of from about 3.0 to about 10.0, an amount of terminal unsaturation ≤0.14 per $1.0\times10^4$ carbon atoms, and a melting point ≥132° C.; (ii) the PE2 has an Mw in the range of from about $1.0\times10^6$ to about $3.0\times10^6$, an MWD in the range of from about 4.0 to about 15.0, and a melting point ≥134° C.; (iii) the PP is an isotactic PP having an Mw in the range of from about $0.9\times10^6$ to about $2.0\times10^6$, an MWD≤8.5, e.g., in the range of from 2.0 to 8.5, e.g., in the range of from 2.5 to 6.0, and a ΔHm≥90.0 J/g, e.g., ≥100.0 J/g (the weight percents being based on the weight of the membrane); (iv) the membrane is microporous; and (v) the membrane has a thickness ≤12.0 μm, such as ≤8.0 μm. Optionally, the membrane contains ≤1.0 wt. % of PE1b based on the weight of the membrane. Such a membrane has, e.g., a meltdown temperature ≥145.0° C., e.g., ≥150.0° C., and a Normalized Pin Puncture Strength ≥3.2×$10^2$ mN/gm, e.g., ≥$3.3\times10^2$ mN/μm. A Normalized Pin Puncture Strength ≥$3.20\times10^2$ mN/μm can be accomplished in membranes produced by extrusion without the need for membrane stretching after diluent removal. Optionally, the combined weight of the PE1a, PE2, and PP is ≥95.0 wt. %, e.g., ≥98.0 wt. %, such as ≥99.0 wt. % of the weight of the membrane. Optionally, the membrane is a monolayer membrane.

Other Species

Optionally, inorganic species (such as species containing silicon and/or aluminum atoms, e.g., silica and/or alumina), and/or heat-resistant polymers such as those described in PCT Publications WO 2007/132942 and WO 2008/016174 (the subject matter of which is incorporated by reference herein) can be present in the membrane. The membrane may contain ≤1.0 wt. % of such materials, based on the weight of the membrane.

A small amount of diluent or other species, e.g., as processing aids, can also be present in the membrane, generally in amounts ≤1.0 wt. % based on the weight of the membrane.

When the microporous membrane is produced by extrusion, the final microporous membrane generally comprises the polymer used to produce the extrudate. A small amount of diluent or other species introduced during processing can also be present, generally in amounts less than 1 wt. % based on the weight of the membrane. A small amount of polymer molecular weight degradation might occur during processing, but this is acceptable. In a form, molecular weight degradation during processing, if any, causes the value of MWD of the polymer in the membrane to differ from the MWD of the polymer used to produce the membrane (e.g., before extrusion) by no more than, e.g., about 10%, or no more than about 1%, or no more than about 0.1%.

Mw and MWD Determination

Polymer Mw and MWD can be determined using a High Temperature Size Exclusion Chromatograph, or "SEC," (GPC PL 220, Polymer Laboratories), equipped with a differential refractive index detector (DRI). The measurement is made in accordance with the procedure disclosed in "*Macromolecules*, Vol. 34, No. 19, pp. 6812-6820 (2001)," the subject matter of which is incorporated herein by reference.

Three PLgel Mixed-B columns (available from Polymer Laboratories) are used for the Mw and MWD determination. For PE, the nominal flow rate is 0.5 cm³/min; the nominal injection volume is 300 μL; and the transfer lines, columns, and the DRI detector are contained in an oven maintained at 145° C. For PP, the nominal flow rate is 1.0 cm³/min; the nominal injection volume is 300 μL; and the transfer lines, columns, and the DRI detector are contained in an oven maintained at 160° C.

The GPC solvent used is filtered Aldrich reagent grade 1,2,4-Trichlorobenzene (TCB) containing approximately 1000 ppm of butylated hydroxy toluene (BHT). The TCB is degassed with an online degasser prior to introduction into the SEC. The same solvent is used as the SEC eluent. Polymer solutions are prepared by placing dry polymer in a glass container, adding the desired amount of the TCB solvent, and then heating the mixture at 160° C. with continuous agitation for about 2 hours. The concentration of polymer solution is 0.25 to 0.75 mg/ml. Sample solutions are filtered off-line before injecting to GPC with 2 μm filter using a model SP260 Sample Prep Station (available from Polymer Laboratories).

The separation efficiency of the column set is calibrated with a calibration curve generated using seventeen individual polystyrene standards ranging in Mp ("Mp" being defined as the peak in Mw) from about 580 to about 10,000,000. The polystyrene standards are obtained from Polymer Laboratories (Amherst, Mass.). A calibration curve (log Mp vs. retention volume) is generated by recording the retention volume at the peak in the DRI signal for each PS standard and fitting this data set to a 2nd-order polynomial. Samples are analyzed using IGOR Pro, available from Wave Metrics, Inc.

Methods for producing the microporous membranes will now be described in more detail. While our membranes and methods are described in terms of a monolayer membrane produced by extrusion, this disclosure is not limited thereto, and this description is not meant to foreclose other examples within the broader scope of the disclosure.

Membrane Production Method

The microporous membranes can be produced by combining the first polyethylene (e.g., PE1), the second polyethylene (e.g., PE2) and the polypropylene (e.g., PP) (e.g., by dry blending or melt mixing) with diluent and optional constituents such as inorganic fillers to form a mixture and then extruding the mixture to form an extrudate. At least a portion of the diluent may be removed from the extrudate to form the microporous membrane. For example, a blend of PE1, PE2 and PP can be combined with diluent such as liquid paraffin to form a mixture, with the mixture being extruded and processed to form a monolayer membrane having a thickness ≤12.0 μm. Additional layers can be applied to the extrudate, if desired, e.g., to provide the finished membrane with a low shutdown functionality. In other words, monolayer extrudates or monolayer microporous membranes can be laminated or coextruded to form multilayered membranes.

The process of producing the membrane may comprise stretching the extrudate in at least one planar direction before diluent removal. The process may optionally further comprise stretching the membrane in at least one planar direction after diluent removal. The process for producing the membrane may optionally further comprise steps for, e.g., removing at least a portion of any remaining volatile species from the membrane at any time after diluent removal, subjecting the membrane to a thermal treatment (such as heat setting or annealing) before or after diluent removal. Optional steps for, hot solvent treatment, cross-linking with ionizing radiation, a hydrophilic treatment and the like, as described in PCT Publication WO 2008/016174, can be conducted if desired. Neither the number nor order of the optional steps is critical.

Producing the Polymer-Diluent Mixture

PE1, PE2, and PP may be introduced with one or more diluents and mixed to form a polymer-diluent mixture. For example, PE1, PE2, and PP can be combined to form a polymer blend, and the blend is combined with diluent (which can be a mixture of diluents, e.g., a solvent mixture) to produce a polymer-diluent mixture. Mixing can be conducted in, e.g., an extruder such as a reaction extruder. These extruders include, without limitation, twin-screw extruders, ring extruders, and planetary extruders. Practice of our processes is not limited to the type of extruder employed. Optional species can be included in the polymer-diluent mixture, e.g., fillers, antioxidants, stabilizers, and/or heat-resistant polymers. The type and amounts of these optional species can be the same as described in PCT Publications WO 2007/132942; WO 2008/016174; and WO 2008/140835.

The diluent is generally compatible with the polymers used to produce the extrudate. For example, the diluent can be any species or combination of species capable of forming a single phase in conjunction with the resin at the extrusion temperature. Examples of the diluent include one or more of aliphatic or cyclic hydrocarbon such as nonane, decane, decalin and paraffin oil, and phthalic acid ester such as dibutyl phthalate and dioctyl phthalate. Paraffin oil with a kinetic viscosity of 20-200 cSt at 40° C. can be used, for example. The diluent can be the same as those described in U.S. Patent Publication Nos. 2008/0057388 and 2008/0057389, the subject matter of both of which are incorporated by reference.

The amount $A_1$ of the first polyethylene (PE1) may be in the range of 70.0 wt. % ≤ $A_1$ ≤ 85.0 wt. %, the weight percent being based on the total weight of the polymer in the mixture. Optionally, $A_1$ may be in the range of 72.0 wt. % ≤ $A_1$ ≤ 84.0 wt. %, e.g., in the range of 75.0 wt. % to 83.0 wt. %, based on the total weight of polymer in the mixture. The amount $A_2$ of the second polyethylene (PE2) may be in the range of 1.0 wt. % ≤ $A_2$ ≤ 19.0 wt. %, the weight percent being based on the total weight of the polymer in the mixture. Optionally, $A_2$ may be in the range of 3.0 wt. % ≤ $A_2$ ≤ 15.0, e.g., in the range of 5.0 wt. % to 13.0 wt. %, based on the total weight of polymer in the mixture. The amount $A_3$ of polypropylene (PP) may be in the range of 1.0 wt. % ≤ $A_3$ ≤ 15.0 wt. %, the weight percent being based on the total weight of the polymer in the mixture. Optionally, $A_3$ may be in the range of 3.0 wt. % ≤ $A_3$ ≤ 15.0, e.g., in the range of 5.0 wt. % to 12.0 wt. %, based on the total weight of polymer in the mixture. The sum of (i) the amount $A_2$ of the first polyethylene (PE1) and (ii) the amount $A_3$ of the polypropylene (PP) may be an amount $B_1$ in the range of 15.0 wt. % ≤ $B_1$ ≤ 30.0 wt. %, the weight percent being based on the total weight of the polymer in the mixture. Optionally, $B_1$ may be in the range of 16.0 wt. % ≤ $B_1$ ≤ 28.0, e.g., in the range of 17.0 wt. % to 25.0 wt. %, based on the total weight of polymer in the mixture. $A_2$ may be in the range of 4.75 wt. % ≤ $A_2$ ≤ 15.25 wt. %.

Optionally, the polymer-diluent mixture may comprise ≤45.0 wt. % polymer based on the weight of the mixture, e.g., in the range of 30.0 wt. % to 40.0 wt. %. The balance can be diluent.

The polymer-diluent mixture during extrusion may be exposed to a temperature in the range of 140° C. to 250° C., e.g., 210° C. to 230° C.

Producing the Extrudate

The polymer-diluent mixture may be conducted from an extruder through a die to produce the extrudate. The extrudate should have an appropriate thickness to produce, after the processing steps, a final membrane having the desired thickness (generally ≤12.0 μm). For example, the extrudate can have a thickness in the range of about 1.0 μm to about 10.0 μm, or about 3.0 μm to 8.0 μm. The finished membrane may have a final membrane thickness (after processing) ≤12.0 μm, e.g., ≤10.0 μm.

Extrusion is generally conducted with the polymer-diluent mixture in the molten state. When a sheet-forming die is used, the die lip is generally heated to an elevated temperature, e.g., in the range of 180° C. to 240° C. Suitable process conditions for accomplishing the extrusion are disclosed in PCT Publications WO 2007/132942 and WO 2008/016174.

If desired, the extrudate can be exposed to a temperature in the range of about 10° C. to about 45° C. to form a cooled extrudate. Cooling rate is not particularly critical. For example, the extrudate can be cooled at a cooling rate of at least about 30° C./minute until the temperature of the extrudate (the cooled temperature) is approximately equal to the extrudate's gelation temperature (or lower). Process conditions for cooling can be the same as those disclosed in PCT Publications No. WO 2007/132942; WO 2008/016174; and WO 2008/140835, for example.

Stretching the Extrudate (Upstream Stretching)

The extrudate or cooled extrudate can be stretched in at least one direction, e.g., in a planar direction such as MD or TD. It is believed that such stretching results in at least some orientation of the polymer in the extrudate. This orientation is referred to as "upstream" orientation. In upstream stretching (also called "wet" stretching), the extrudate can be stretched by, for example, a tenter method, a roll method, an inflation method or a combination thereof, as described in PCT Publication No. WO 2008/016174, for example. The stretching may be conducted monoaxially or biaxially. In the case of biaxial stretching, any of simultaneous biaxial stretching, sequential stretching or multi-stage stretching (for instance, a combination of the simultaneous biaxial stretching and the sequential stretching) can be used. When biaxial stretching is used, the amount of magnification need not be the same in each stretching direction.

The upstream stretching magnification can be, for example, 2 fold or more, e.g., 3 to 30 fold in the case of monoaxial stretching. In the case of biaxial stretching, the stretching magnification can be, for example, 3 fold or more in any direction, namely 9 fold or more, such as 16 fold or more, e.g., 25 fold or more, in area magnification. An example for this stretching step would include stretching from about 9 fold to about 49 fold in area magnification. Again, the amount of stretching in either direction need not be the same. The magnification factor operates multiplicatively on film size. For example, a film having an initial width (TD) of 2.0 cm that is stretched in TD to a magnification factor of 4 fold will have a final width of 8.0 cm.

The stretching can be conducted while exposing the extrudate to a temperature (the upstream stretching temperature) in the range of from about the Tcd temperature to Tm, where Tcd and Tm are defined as the crystal dispersion temperature and melting point of the PE having the lowest melting point among the polyethylenes used to produce the extrudate (generally the PE such as PE1 or PE2). The crystal dispersion temperature is determined by measuring the temperature characteristics of dynamic viscoelasticity according to ASTM D 4065. In instances where Tcd is in the range of about 90° C. to about 100° C., the upstream stretching temperature can be from 90.0° C. to 122.0° C.; e.g., from about 108.0° C. to 116.0° C., such as from 110.0° C. to 114.0° C.

When the sample (e.g., the extrudate, dried extrudate, membrane and the like) is exposed to an elevated temperature, this exposure can be accomplished by heating air and then conveying the heated air into proximity with the sample. The temperature of the heated air, which is generally controlled at a set point equal to the desired temperature, is then conducted toward the sample through a plenum for example. Other methods for exposing the sample to an elevated temperature, including conventional methods such as exposing the sample to a heated surface, infra-red heating in an oven and the like, can be used with or instead of heated air.

Diluent Removal

At least a portion of the diluent may be removed (or displaced) from the stretched extrudate to form a dried membrane. A displacing (or "washing") solvent can be used to remove (wash away, or displace) the diluent, as described in PCT Publication No. WO 2008/016174, for example.

At least a portion of any remaining volatile species (e.g., washing solvent) may be removed from the dried membrane after diluent removal. Any method capable of removing the washing solvent can be used, including conventional methods such as heat-drying, wind-drying (moving air) and the like. Process conditions for removing volatile species such as washing solvent can be the same as those disclosed in PCT Publication No. WO 2008/016174, for example.

Optional Stretching the Membrane (Downstream Stretching)

Following removal of at least a portion of the diluent, the membrane is referred to as a "dried" membrane. The dried membrane can be stretched (called "downstream stretching") in at least one direction, e.g., MD and/or TD. Downstream stretching can also be referred to as "dry stretching" since at least a portion of the diluent has been removed or displaced from the membrane. It is believed that such stretching results in at least some orientation of the polymer in the membrane. This orientation is referred to as downstream orientation. Before downstream stretching, the dried membrane has an initial size in MD (a first dry length) and an initial size in TD (a first dry width). As used herein, the term "first dry width" refers to the size of the dried membrane in TD prior to the start of downstream stretching. The term "first dry length" refers to the size of the dried membrane in MD prior to the start of downstream stretching, Tenter stretching equipment of the kind described in WO 2008/016174 can be used, for example.

The dried membrane can be stretched in MD from the first dry length to a second dry length that is larger than the first dry length by a magnification factor (the "MD dry stretching magnification factor") in the range of from about 1.0 to about 1.6, e.g., in the range of 1.1 to 1.5. When TD downstream stretching is used, the dried membrane can be stretched in TD from the first dry width to a second dry width that is larger than the first dry width by a magnification factor (the "TD downstream stretching magnification factor"). Optionally, the TD downstream stretching magnification factor is ≥the MD downstream stretching magnification factor. The TD downstream stretching magnification factor can be in the range of from about 1.1 to about 1.6, e.g., about 1.1 to 1.5. The downstream stretching can be sequential or simultaneous in MD and TD. When biaxial downstream stretching is used, the downstream stretching can be simultaneous in MD and TD or sequential. When the downstream stretching is sequential, generally MD stretching is conducted first, followed by TD stretching.

In view of the thickness of certain membranes, downstream stretching may be avoided or minimized. For example, the processing steps that produce films having a desired thickness are devoid of any step of downstream stretching. The processing steps may include downstream stretching to a magnification factor of ≤1.1, ≤1.08, ≤1.05, and ≤1.03. The process for producing the membranes may be devoid of downstream stretching.

The downstream stretching can be conducted while exposing the dried membrane to a temperature (the downstream stretching temperature) ≤Tm, e.g., in the range of from about Tcd-20° C. to Tm. The downstream stretching temperature may be conducted with the membrane exposed to a temperature in the range of from about 70.0° C. to about 135.0° C., for example, from about 110.0° C. to about 132.0° C., such as from about 120.0° C. to about 130.0° C.

The MD downstream stretching magnification may be about 1.0; the TD downstream stretching magnification is ≤1.6, e.g., in the range of from about 1.05 to about 1.5, such as 1.1 to 1.5; and the downstream stretching may be conducted while the membrane is exposed to a temperature in the range of about 120.0° C. to about 130.0° C.

The dry stretching rate is not critical. The dry stretching rate may be ≥1%/second in the stretching direction (MD or TD), and the rate can be independently selected for MD and TD stretching. Optionally, the stretching rate may be ≥2%/second, e.g., ≥3%/second, such as ≥10%/second. The stretching rate may be in the range of 2%/second to 25%/second. Though not critical, the upper limit of the stretching rate may generally be ≤50%/second to prevent rupture of the membrane.

Controlled Reduction of the Membrane's Width

Following the downstream stretching, the dried membrane optionally can be subjected to a controlled reduction in width from the second dry width to a third dry width, the third dry width being in the range of from 0.9 times the first dry width to about 1.5 times larger than the first dry width. Optionally, the second dry width is in the range of 1.25 to 1.35 of the first dry width and the third dry width is in the range of 0.95 to 1.05 of the first dry width. The width reduction generally conducted while the membrane is exposed to a temperature ≥Tcd−30° C., but no greater than Tm, e.g., with the membrane exposed to a temperature in the range of from about 70.0° C. to about 135.0° C., for example, from about 110.0° C. to about 132.0° C., such as from about 120.0° C. to about 130.0° C.

Although the temperature to which the membrane is exposed during the controlled width reduction can be the same as the downstream stretching temperature, this is not required, and the temperature to which the membrane is exposed during controlled width reduction may be ≥1.01 times the downstream stretching temperature, e.g., in the range of 1.05 times to 1.1 times. In a form, the decreasing of the membrane's width is conducted while the membrane is exposed to a temperature that ≤130.0° C., the third dry width is in the range of from 0.95 to 1.05 of the first dry width.

Heat Set

Optionally, the membrane is thermally treated (heat-set) at least once following diluent removal, e.g., after downstream stretching, the controlled width reduction, or both. It is believed that heat-setting stabilizes crystals and makes uniform lamellas in the membrane. In a form, the heat setting is conducted while exposing the membrane to a temperature (the "heat set temperature") in the range Tcd to Tm, e.g., in the range of from about 70.0° C. to about 135.0° C., for example, from about 110.0° C. to about 132.0° C., such as from about 120.0° C. to about 130.0° C. When the membrane is (i) produced by extruding a mixture of diluent and a polymer blend of PE1a, PE2, and PP; (ii) the sum of PE2 and PP is ≤20.0 wt. based on the weight of the polymer in the membrane; and (iii) the heat set temperature is ≤126.5° C., such as ≤126.0° C., it can be more difficult to produce a membrane having a Normalized Pin Puncture Strength ≥3.20×10².

Although the heat set temperature can be the same as the downstream stretching temperature, this is not required. The temperature to which the membrane is exposed during heat setting may be ≥1.01 times the downstream stretching temperature, e.g., in the range of 1.05 times to 1.1 times. Generally, the heat setting is conducted for a time sufficient to form uniform lamellas in the membrane, e.g., a time ≤1000 seconds, e.g., in the range of 1 to 600 seconds. The heat setting may be operated under conventional heat-set "thermal fixation" conditions. The term "thermal fixation" refers to heat-setting carried out while maintaining the length and width of the membrane substantially constant, e.g., by holding the membrane's perimeter with tenter clips during the heat setting.

Optionally, an annealing treatment can be conducted after the heat-set step. The annealing is a heat treatment with no load applied to the membrane, and can be conducted by using, e.g., a heating chamber with a belt conveyer or an air-floating-type heating chamber. The annealing may also be conducted continuously after the heat-setting with the tenter slackened. During annealing, the membrane can be exposed to a temperature in the range of Tm or lower, e.g., in the range from about 60° C. to about Tm −5° C. Annealing is believed to provide the microporous membrane with improved permeability and strength.

Optional heated roller, hot solvent, crosslinking, hydrophilizing, and coating treatments can be conducted, if desired, e.g., as described in PCT Publication No. WO 2008/016174.

Membrane Properties

The membrane may be a microporous membrane that is permeable to liquid (aqueous and non-aqueous) at atmospheric pressure. Thus, the membrane can be used as a battery separator, filtration membrane and the like. The membrane is particularly useful as a BSF for a secondary battery, such as a nickel-hydrogen battery, nickel-cadmium battery, nickel-zinc battery, silver-zinc battery, lithium-ion battery, lithium-ion polymer battery and the like. The disclosure relates to lithium-ion secondary batteries containing BSF comprising membrane. Such batteries are described in PCT Patent Publication WO 2008/016174. The microporous membrane may be a monolayer that is useful as a BSF for polymer batteries such as lithium-ion polymer batteries. As used herein the term "polymer electrolyte" is used in its ordinary sense to refer to the electrolyte within a polymer battery. Since BSFs for lithium ion polymer batteries are generally thin (thickness ≤12.0 μm), and since membrane pin puncture strength is generally proportional to membrane thickness (for membranes of the same porosity and composition), BSFs for lithium ion polymer batteries benefit from a pin puncture strength per unit thickness that is larger than the pin puncture strength per unit thickness of BSFs used in battery types utilizing thicker BSFs, such a cylindrical and prismatic lithium ion batteries. Accordingly, it is desirable that BSFs for lithium ion polymer batteries have a normalized pin puncture strength ≥3.20×10² mN/μm.

The membranes can have one or more of the following properties.

Thickness

The thickness of the final membrane may be ≤12.0 μm, or ≤10.0 μm, or even ≤8.0 μm, e.g., in the range of about 1.0 μm to about 10.0 μm, such as in the range of from 4.5 μm to about 9.5 μm or from 6.0 μm to 8.0 μm. The membrane's thickness can be measured, e.g., by a contact thickness meter at 1 cm longitudinal intervals over the width of 10 cm, and then averaged to yield the membrane thickness. Thickness meters such as a Model RC-1 Rotary Caliper, available from Maysun, Inc., 746-3 Gokanjima, Fuji City, Shizuoka, Japan 416-0946 or a "Litematic" available from Mitsutoyo Corporation, are suitable. Non-contact thickness measurement methods are also suitable, e.g., optical thickness measurement methods.

Porosity

The membrane's porosity is measured conventionally by comparing the membrane's actual weight to the weight of an equivalent non-porous membrane of 100% polymer (equivalent in the sense of having the same polymer composition, length, width, and thickness). Porosity is then determined using the formula: Porosity (expressed as a percent)=99%× (w1/w2), where "w1" is the actual weight of the membrane, and "w2" is the weight of an equivalent non-porous membrane (of the same polymers) having the same size and thickness. The membrane's porosity may be ≥20.0%, e.g., in the range of 20.0% to 80.0%.

Normalized Air Permeability

The membrane may have a normalized air permeability of ≤50.0 seconds/100 $cm^3/\mu m$, e.g., in the range of from about 10.0 seconds/100 $cm^3/\mu m$ to about 45.0 seconds/100 $cm^3/\mu m$, such as from about 15.0 seconds/100 $cm^3/\mu m$ to about 40.0 seconds/100 $cm^3/\mu m$. Since the air permeability value is normalized to the value for an equivalent membrane having a film thickness of 1.0 µm, the membrane's air permeability value is expressed in units of "seconds/100 $cm^3/1.0$ µm." Normalized air permeability is measured according to JIS P8117, and the results are normalized to the permeability value of an equivalent membrane having a thickness of 1.0 µm using the equation $A=1.0 \mu m^*(X)/T_1$, where X is the measured air permeability of a membrane having an actual thickness $T_1$ and A is the normalized air permeability of an equivalent membrane having a thickness of 1.0 µm.

Normalized Pin Puncture Strength

The membrane's pin puncture strength is expressed as the pin puncture strength of an equivalent membrane having a thickness of 1.0 µm and a porosity of 30% and has the units [mN/µm]. Pin puncture strength is defined as the maximum load measured at ambient temperature when the membrane having a thickness of $T_1$ is pricked with a needle of 1 mm in diameter with a spherical end surface (radius R of curvature: 0.5 mm) at a speed of 2 mm/second. The pin puncture strength ("S") is normalized to the pin puncture strength value of an equivalent membrane having a thickness of 1.0 µm and a porosity of 30% using the equation $S_2=[30\%^*1.0 \mu m^*(S_1)]/[T_1^*(100\% -P)]$, where $S_1$ is the measured pin puncture strength, $S_2$ is the normalized pin puncture strength, P is the membrane's measured porosity, and $T_1$ is the average thickness of the membrane. The membrane's normalized pin puncture strength may be ≥3.20×10$^2$ mN/µm. Optionally, the membrane's normalized pin puncture strength may be ≥3.3× 10$^2$ mN/µm, e.g., ≥3.4×10$^2$ mN/µm, such as in the range of 3.20×10$^2$ mN/µm to 4.50×10$^2$ mN/µm.

Shutdown Temperature

The microporous membrane's shutdown temperature is measured by the method disclosed in PCT Publication No. WO2007/052663, the subject matter of which is incorporated by reference herein. According to that method, the microporous membrane is exposed to an increasing temperature (5° C./minute) starting at 25° C. while measuring the membrane's air permeability. The microporous membrane's shutdown temperature is defined as the temperature at which the microporous membrane's air permeability (Gurley Value) first exceeds 1.0×10$^5$ secs./100 cm$^3$. The microporous membrane's air permeability is measured according to JIS P8117 using an air permeability meter (EGO-1T available from Asahi Seiko Co., Ltd.). The shut down temperature is ≤136° C., such as in the range of 132.5° C. to 134.5° C.

Meltdown Temperature

The microporous membrane's shutdown temperature is measured using a procedure similar to the measurement of shutdown temperature. According to this method, the microporous membrane is exposed to an increasing temperature (5° C./minute) starting at 25° C. while measuring the membrane's air permeability, to a temperature exceeding the membrane's Shutdown temperature. The membrane heating continues, and the microporous membrane's Meltdown temperature is defined as the temperature at which the microporous membrane's air permeability (Gurley Value) first decreases to a value of 1.0×10$^5$ secs./100 cm$^3$. The microporous membrane's air permeability is measured according to JIS P8117 using an air permeability meter (EGO-1T available from Asahi Seiko Co., Ltd.). The Meltdown temperature of the membranes may be ≥145.0° C., e.g., ≥150.0° C., such as ≥160.0° C. The Meltdown temperature may be in the range of 150.0° C. to 165° C.

105° C. Heat Shrinkage

The membrane may have a heat shrinkage at 105° C. in at least one planar direction (e.g., MD or TD) of ≤10.0% e.g., ≤5.0%, such as in the range of from 1.0% to 5.0%. The membrane's shrinkage at 105° C. in MD and TD is measured as follows: (i) measure the size of a test piece of microporous membrane at ambient temperature in both the MD and TD; (ii) equilibrate the test piece of the microporous membrane at a temperature of 105° C. for 8 hours with no applied load; and then (iii) measure the size of the membrane in both the MD and TD. The heat (or "thermal") shrinkage in MD and TD can be obtained by dividing the result of measurement (i) by the result of measurement and (ii) expressing the resulting quotient as a percent.

Tensile Strength

The membrane may have an MD and TD tensile strengths each ≥1.4×10$^5$ kPa, e.g., in the range of 1.5×10$^5$ kPa to 2.0× 10$^5$ kPa. Tensile strength is measured in MD and TD according to ASTM D-882A.

Our membranes and methods will be described in more detail with reference to Examples below without intention of restricting the scope of this disclosure.

EXAMPLES

Example 1

(1) Preparation of the Polymer-Diluent Mixture

A polymer-diluent mixture is prepared as follows by combining diluent and a polymer blend of a first polyethylene (PE1a), a second polyethylene (PE2), and a polypropylene (PP1). The polymer blend comprises (a) 85.0 wt. % of PE1 having an Mw of 5.6×10$^5$, an MWD of 4.0, an amount of terminal unsaturation ≤0.14 per 1.0×10$^4$ carbon atoms, and a Tm of 136.0° C. (PE1); (b) 10.0 wt. % of PE2 having a Mw of 1.9×10$^6$, and MWD of 5.1, and a Tm of 136.0° C.; and (c) 5.0 wt. % of isotactic PP having an Mw of 5.3×10$^5$ and a ΔHm of 114 J/g, the weight percents being based on the weight of the combined polymer (PP1).

Next, the polymer blend is charged into a strong-blending double-screw extruder having an inner diameter of 58 mm and L/D of 42, and liquid paraffin (50 cst at 40° C.) is supplied to the double-screw extruder via a side feeder. Mixing is conducted at about 220° C. (or as indicated in the Table) and 320 rpm to produce the polymer-diluent mixture, which included about 37.5 wt. % polymer and 62.5 wt. % diluent (or as indicated in the Table), the weight percents being based on the weight of the polymer-diluent mixture.

(2) Production of Membrane

The polymer-diluent mixture is conducted from the extruder to a sheet-forming die, to form an extrudate (in the form of a sheet). The die temperature is about 210° C. The extrudate is cooled by contact with cooling rollers controlled at about 20° C. The cooled extrudate is simultaneously biaxially stretched (upstream stretching) at about 112.5° C. (or as indicated in the Table) to a magnification of 5 fold in both MD and TD by a tenter-stretching machine. The stretched three-layer gel-like sheet is then immersed in a bath of methylene chloride controlled at 25° C. to remove liquid paraffin to an amount ≤1.0 wt. % based on the weight of the liquid paraffin in the polymer-diluent mixture. The membrane is then dried by air flow at room temperature. While holding the size of the membrane substantially constant the membrane is heat-set by exposing the membrane to a heat set temperature of about 128.0° C. (or as indicated in the Table) for about 10 minutes to produce the final microporous membrane. Notably, those membranes where the Table indicates 1.00 Magnification did not undergo downstream stretching. Selected starting materials, process conditions, and membrane properties are set out in Table 1.

Examples 2 and 3 and Comparative Examples C1-C6

Example 1 is repeated except as noted in Table 1. Starting materials and process conditions are the same as are used in Example 1, except as noted in the Table. For example, PP1 may be replaced by a polypropylene having an Mw of $1.1 \times 10^6$ and a $\Delta Hm$ of 114 J/g (PP2). Or, PE1a may be replaced by a PE1b having an $Mw=7.46 \times 10^5$, a Tm of 134.0° C., and a terminal unsaturation amount ≥0.20 per $1.0 \times 10^4$ carbon atoms (PE2). Example 2 utilizes downstream stretching in TD, to a magnification factor of 1.4. Comparative example 6 utilizes downstream stretching in TD, to a magnification factor of 1.2. The downstream stretching in both cases is conducted at the specified heat set temperature.

TABLE 1

| | | Example No. | | |
|---|---|---|---|---|
| | | 1 | 2 | 3 |
| PE2 | Content (wt. %) | 10.0 | 10.0 | 15.0 |
| PE1a or PE1b | Grade | PE1a | PE1a | PE1a |
| | Content (wt. %) | 85.0 | 85.0 | 80.0 |
| PP | Grades | PP1 | PP2 | PP2 |
| | Content (wt. %) | 5.0 | 5.0 | 5.0 |
| Sum PE2 and PP | | 15.0 | 15.0 | 20.0 |
| Processing Condition | | | | |
| Polymer content (wt. %) polymer-diluent mixture | | 37.5 | 35.0 | 35.0 |
| Upstream Stretching | | | | |
| Temperature (° C.) | | 112.5 | 112.5 | 112.5 |
| Downstream stretching and Heat Set | | | | |
| Temperature (° C.) | | 128.0 | 129.6 | 126.7 |
| Magnification | | 1.00 | 1.40 | 1.00 |
| Properties | | | | |
| Average Thickness (μm) | | 6.9 | 7.6 | 7.4 |
| Porosity (%) | | 28.7 | 32.1 | 32.8 |
| Normalized Air Permeability (sec/100 cm$^3$/μm) | | 38.0 | 34.9 | 36.3 |
| Normalized Pin Puncture Strength (mN/μm) | | 326 | 350 | 334 |
| TD Heat Shrinkage at 105° C. (%) | | 4.1 | 3.4 | 4.5 |
| MD Heat Shrinkage at 105° C. (%) | | 3.4 | 3.4 | 4.0 |
| Meltdown Temperature (° C.) | | ≥145 | ≥145 | 150.7 |
| TD Tensile (×10$^5$ kPa) | | 1.833 | 1.558 | 1.831 |
| MD Tensile (×10$^5$ kPa) | | 1.506 | 2.066 | 1.515 |
| TD Elongation (%) | | 197 | 101 | 175 |
| MD Elongation (%) | | 133 | 156 | 135 |

| | | Comparative Example No. | | | | | |
|---|---|---|---|---|---|---|---|
| | | C1 | C2 | C3 | C4 | C5 | C6 |
| PE2 | Content (wt. %) | 18.0 | 10.0 | 30.0 | 5.0 | 5.0 | 5.0 |
| PE1a or PE1b | Grade | PE1b | PE1a | PE1a | PE1a | PE1a | PE1a |
| | Content (wt. %) | 82.0 | 85.0 | 70.0 | 90.0 | 90.0 | 90.0 |
| PP | Grades | NA | PP2 | NA | PP1 | PP1 | PP1 |
| | Content (wt. %) | 0.0 | 5.0 | 0.0 | 5.0 | 5.0 | 5.0 |
| Sum of PE2 and PP | | 18.0 | 15.0 | 30.0 | 10.0 | 10.0 | 10.0 |
| Processing Condition | | | | | | | |
| Polymer content (wt. %) polymer-diluent mixture | | 30.0 | 35.0 | 30.0 | 35.0 | 37.5 | 37.5 |
| Upstream Stretching | | | | | | | |
| Temperature (° C.) | | 113.2 | 112.5 | 115.0 | 112.5 | 112.5 | 112.5 |
| Downstream stretching and Heat Set | | | | | | | |
| Temperature (° C.) | | 126.2 | 127.5 | 129.0 | 128.8 | 128.8 | 129.8 |
| TD Magnification Factor | | 1.00 | 1.00 | 1.00 | 1.00 | 1.00 | 1.20 |
| Properties | | | | | | | |
| Average Thickness (μm) | | 7.0 | 7.3 | 7.1 | 7.2 | 7.2 | 7.2 |
| Porosity (%) | | 30.8 | 31.6 | 28.7 | 30.3 | 31.5 | 31.4 |
| Normalized Air Permeability (sec/100 cm$^3$/μm) | | 35.4 | 36.6 | 36.0 | 37.4 | 36.6 | 36.0 |

TABLE 1-continued

| | | | | | | |
|---|---|---|---|---|---|---|
| Normalized Pin Puncture Strength (mN/μm) | 298 | 310 | 307 | 211 | 295 | 334 |
| MD Heat Shrinkage at 105° C. (%) | 4.9 | 3.8 | 2.0 | 2.8 | 3.2 | 2.8 |
| TD Heat Shrinkage at 105° C. (%) | 3.4 | 2.8 | 2.6 | 2.9 | 3.4 | 3.8 |
| Meltdown Temperature (° C.) | 146.7 | 146.6 | <145 | 145.0 | 145.6 | ≥145 |
| TD Tensile (×10$^5$ kPa) | 1.265 | 1.489 | 1.408 | 1.693 | 1.782 | 1.686 |
| MD Tensile (×10$^5$ kPa) | 1.844 | 1.720 | 2085 | 1.418 | 1.298 | 1.702 |
| TD Elongation (%) | 190 | 173 | 184 | 189 | 176 | 127 |
| MD Elongation (%) | 100 | 125 | 116 | 120 | 128 | 134 |

Examples 1-3 show that thin microporous membranes (e.g., <12.0 μm thick) having useful meltdown temperature deriving from the presence of PP, can be prepared with useful strength of lithium ion polymer batteries (e.g., Normalized Pin Puncture Strength ≥3.20×10$^2$ mN/μm) even in the absence of downstream stretching (Examples 1 and 3). In other words, the data shows that the presence of both PE2 and PP, in a combined amount ≥15.0 wt. % of the polymer in the membrane, contributes to increased strength and thereby obviates the need for downstream stretching. This latter aspect is particularly advantageous because downstream stretching of thin membranes is often problematic and leads to tearing of the membranes, which reduces overall yield. Comparative Examples 1 and 3 show that without PP the membrane's meltdown temperature is undesirably low. A comparison of Example 1 and Comparative Example 2 shows that for extruded membranes having a combined amount of PP and PE2 equal to about 15.0 wt. %, based on the weight of the membrane, the polymer-diluent mixture should have a polymer content >35.0 wt. %, e.g., >37.0 wt. %, for the membrane to achieve a Normalized Pin Puncture Strength ≥3.20×10$^2$ mN/μm. Comparative Examples 4, 5, and 6 show that when the combined amount of PE2 and PP is <15.0 wt. %, downstream stretching is needed for the membrane to achieve a Normalized Pin Puncture Strength ≥3.20×10$^2$ mN/μm.

All patents, test procedures, and other documents cited herein, including priority documents, are fully incorporated by reference to the extent such disclosure is not inconsistent and for all jurisdictions in which such incorporation is permitted.

While the illustrative forms disclosed herein have been described with particularity, it will be understood that various other modifications will be apparent to and can be readily made by those skilled in the art without departing from the spirit and scope of the disclosure. Accordingly, it is not intended that the scope of the claims appended hereto be limited to the examples and descriptions set forth herein but rather that the claims be construed as encompassing all the features of patentable novelty which reside herein, including all features which would be treated as equivalents thereof by those skilled in the art to which this disclosure pertains.

When numerical lower limits and numerical upper limits are listed herein, ranges from any lower limit to any upper limit are contemplated.

The invention claimed is:

1. A process of producing a microporous membrane comprising:
   (1) extruding a mixture of diluent and polymer to form an extrudate, the polymer comprising a first polyethylene having an Mw<1.0×10$^6$, a second polyethylene having an Mw≥1.0×10$^6$, and a polypropylene having an Mw≥5.0×10$^5$ and a ΔHm≥80.0 J/g; wherein the sum of the amounts of the polypropylene having an Mw≥5.0×10$^5$ and a ΔHm≥80.0J/g and the second polyethylene is ≥15.0 wt. %, all the weight percents being based on the total weight of the polymer in the mixture; and
   (2) processing the extrudate into the microporous membrane having a thickness ≥12.0 μm by stretching the extrudate in at least one planar direction at a temperature of about 108.0 to 116.0° C. after removing the solvent to a magnification factor of ≥1.1 and excludes any stretching of the extrudate after said step of removing the solvent at a magnification factor of ≥1.1 and removing at least a portion of the diluent from the extrudate and having a Normalized Pin Puncture strength from 326 to 350 mN/μm;
   wherein biaxially processing comprises:
   (a) biaxially stretching the extrudate in at least one planar direction at a magnification factor of from 9-fold to 49-fold in area, while exposing the extrudate to a temperature in the range of 90.0° C. to 125.0° C.,
   (b) removing at least a portion of the diluent from the extrudate,
   (c) cooling the extrudate,
   (d) subjecting the membrane to a thermal treatment, and
   (e) removing any remaining volatile species from the membrane.

2. A battery, comprising an anode, a cathode, an electrolyte, and battery separator located between the anode and the cathode, the battery separator being the microporous membrane of claim 1, wherein a first polyethylene having an Mw<1.0×10$^6$, a second polyethylene having an Mw≥1.0×10$^6$, and a polypropylene having an Mw≥5.0×10$^5$ and a ΔHm≥80.0 J/g; wherein (a) the sum of the amounts of (i) the polypropylene having an Mw≥5.0×10$^5$ and a ΔHm≥80.0 J/g and (ii) the second polyethylene is ≥15.0 wt. %, the weight percents being based on the total weight of the polymer in the membrane; (b) the membrane has a thickness ≤12.0 μm; and (c) the membrane is microporous, and
   wherein the polypropylene having an Mw≥5.0×10$^5$ and a ΔHm≥80.0 J/g is present in the membrane in an amount of 1.0 wt. % to 15.0 wt. %, the first polyethylene is present in the membrane in an amount of 70.0 wt. % to 85.0 wt. %, and the second polyethylene is present in the membrane in an amount of 1.0 wt. % to 19.0 wt. %, based on the total weigh of the polymer in the membrane that has a meltdown temperature ≥145.0° C. and a normalized pin puncture strength ≥3.20×10$^2$ mN/μm, and a TD Tensile strength ≥1.4×10$^5$ kPa and having Normalized Pin Puncture strength from 326 to 350 mN/μm.

3. An electric vehicle or hybrid electrical vehicle comprising a motor electrically connected to the battery of claim 2.

* * * * *

UNITED STATES PATENT AND TRADEMARK OFFICE
CERTIFICATE OF CORRECTION

PATENT NO.       : 8,710,110 B2                                    Page 1 of 1
APPLICATION NO.  : 13/912538
DATED            : April 29, 2014
INVENTOR(S)      : Kikuchi et al.

It is certified that error appears in the above-identified patent and that said Letters Patent is hereby corrected as shown below:

In the Specification

Column 18

Line 17, please change "$\geq 12.0$" to -- $\leq 12.0$ --, and at line 20, please change "$\geq 1.1$" to -- $\leq 1.1$ --

Signed and Sealed this
Fourth Day of November, 2014

Michelle K. Lee
*Deputy Director of the United States Patent and Trademark Office*